United States Patent [19]
McCormick et al.

[11] Patent Number: 5,660,945
[45] Date of Patent: Aug. 26, 1997

[54] BATTERY HAVING A LATCHING MECHANISM WITH TORSION PLATES

[75] Inventors: Timothy P. McCormick, Madison, Wis.; Kenneth John Roback, Arlington Heights, Ill.

[73] Assignee: Motorola, Inc., Schaumburg, Ill.

[21] Appl. No.: 655,582

[22] Filed: May 30, 1996

[51] Int. Cl.$^6$ .................................................. H01M 2/10
[52] U.S. Cl. ................................................. 429/123; 429/97
[58] Field of Search ............................. 429/97, 100, 123, 429/121, 96, 99, 98; 379/441, 442; 434/500, 504

[56] References Cited

U.S. PATENT DOCUMENTS

| | | | |
|---|---|---|---|
| 4,904,549 | 2/1990 | Goodwin et al. | 429/97 |
| 5,308,216 | 5/1994 | Shababy et al. | 429/97 |

*Primary Examiner*—M. Nuzzolillo
*Attorney, Agent, or Firm*—John J. Oskorep; John G. Rauch

[57] ABSTRACT

A battery (105) includes a battery housing (340) having a latching mechanism (301) for attaching to a radiotelephone body (102). The latching mechanism (301) includes a button portion (405), a first torsion plate (403), a second torsion plate (404), and a catch (401). The battery housing (340) further includes an inner surface (400), a first rib (630), and a second rib (632). The first and second ribs (630, 632) extend upwardly from the inner surface (400) and attach respectively to the first and second torsion plates (403, 404), thereby supporting the latching mechanism (301) at a distance above the inner surface (400). The first and second torsion plates (403, 404), while providing a torsional twisting movement for detaching the battery (105) from the radiotelephone body (102), provide a strong deflection resistance for the latching mechanism (301).

9 Claims, 5 Drawing Sheets

— PRIOR ART —

BATTERY HAVING A LATCHING MECHANISM WITH TORSION PLATES

FIELD OF THE INVENTION

This invention relates generally to batteries, and more particularly to batteries which have latching mechanisms.

BACKGROUND OF THE INVENTION

Small electronic devices are often portable in nature and, as such, require a portable source of power such as a battery. A battery, which typically includes a battery housing, may be conveniently attached to an electronic device where electrical contact is made through conventional electronic coupling.

Several mechanisms have been devised to enable a user to easily connect and disconnect a battery from an electronic device. One such mechanism has been a latching mechanism. As an electronic device becomes smaller, however, volume within the electronic device cannot afford a latching mechanism which is extensive and complex. Thus, it would be advantageous for a latching mechanism to be placed in locations other than within the electronic device itself.

In addition, an electronic device having a battery may be subject to some mechanical stresses, such as those stresses which occur when an electronic device is dropped accidentally. Depending on the latching mechanism's design, the latching mechanism may break or wear from such stresses. Wearing the latching mechanism may cause the battery to be loosely attached to the electronic device. At best, a loosely attached battery may rattle on the electronic device; at worst, the battery may lose electrical contact with the electronic device. Therefore, it would be advantageous to provide a latching mechanism that is durable. In addition, a battery having a simple design for manufacturing is often desirable for reducing manufacturing effort, cost, and time. Also, a battery having a light weight is desirable when considering product cost and electronic device portability.

DETAILED DESCRIPTION OF THE PREFERRED EMBODIMENTS

According to the present invention, a battery includes a battery housing having a latching mechanism for attaching to a radiotelephone body. The latching mechanism includes a button portion, a first torsion plate, a second torsion plate, and a catch. The battery housing further includes an inner surface, a first rib, and a second rib. The first and second ribs extend upwardly from the inner surface and attach respectively to the first and second torsion plates, thereby supporting the latching mechanism at a distance above the inner surface. The first and second torsion plates, while providing a torsional twisting movement for detaching the battery from the radiotelephone body, provide a strong deflection resistance for the latching mechanism. The battery housing may additionally include a third rib and a fourth rib which attach to the first and second torsion plates, and a fifth rib and a sixth rib having ends positioned adjacent to the first and second torsion plates for inhibiting a large deflection of the latching mechanism.

Figure 1:
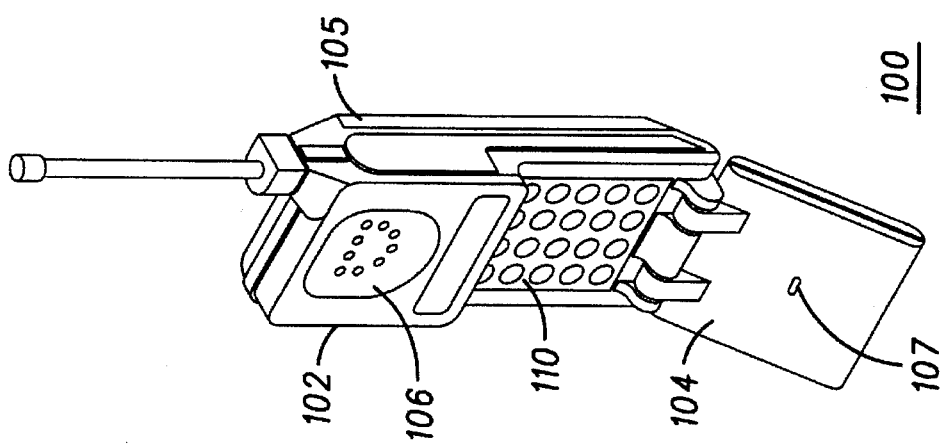
FIG. 1 is an illustration of a radiotelephone which may include the present invention.

A radiotelephone 100 which may embody the present invention is shown in FIG. 1. Radiotelephone 100 comprises a radiotelephone body 102 and a battery 105. Radiotelephone body 102 includes a keypad 110, a keypad cover 104, a microphone 107, and an earpiece 106. FIG. 1 shows keypad cover 104 in an "open" position, such that a user of radiotelephone 100 may listen via earpiece 106 and speak into microphone 107 for communications. Keypad 110 consists of a plurality of buttons numbered zero through nine, # and *, in a familiar telephone arrangement. Keypad 110 also has additional function buttons such as "send", "end", "power", and other buttons associated with telephone number recall.

Since radiotelephone 100 is indeed portable, some source of electrical energy is necessary to power electrical functions of radiotelephone 100. The source of this electrical energy is battery 105, which typically includes a rechargeable electrochemical battery cell or cells. Battery 105, shown attached to radiotelephone body 102 in FIG. 1, is capable of being detached from radiotelephone body 102. A user is able to recharge battery 105 while it is attached to or detached from radiotelephone 100.

Figure 3:
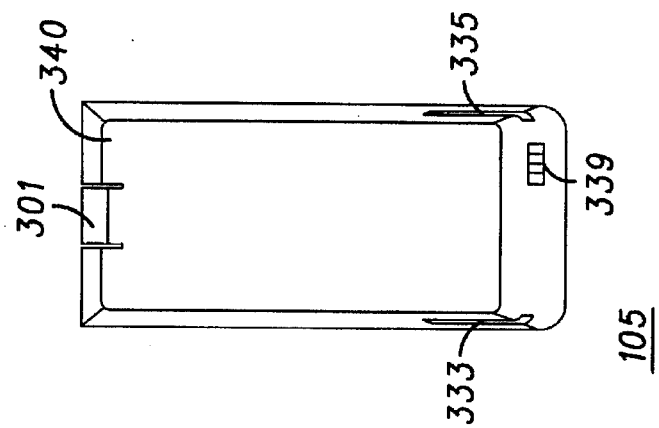
FIG. 3 is a rear-view illustration of a battery of the radiotelephone of FIG. 1.
Figure 2:
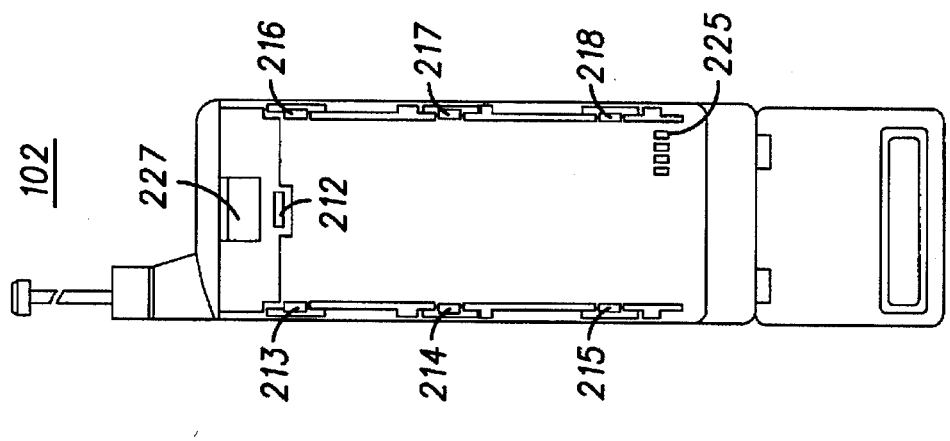
FIG. 2 is a rear-view illustration of a radiotelephone body of the radiotelephone of FIG. 1.

FIG. 2 and FIG. 3 are illustrations showing, respectively, a rear view of radiotelephone body 102 and a rear view of battery 105. Radiotelephone body 102 of FIG. 2 includes an indented area 227, a slot 212, electrical contacts 225, and guide rails 213, 214, 215, 216, 217, and 218. Battery 105 of FIG. 3 includes a battery housing 340. Battery housing 340 includes a latching mechanism 301, lateral slots 333 and 335, and electrical contacts 339.

Figure 5:
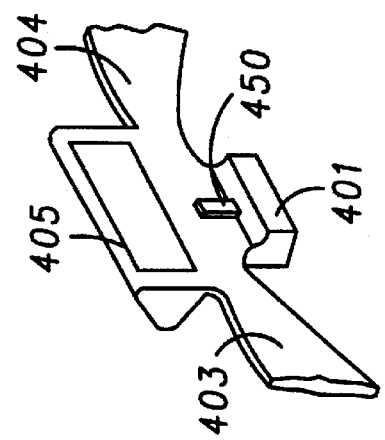
FIG. 5 is a close-up illustration of a latching mechanism of the battery of FIGS. 3 and 4.
Figure 4:
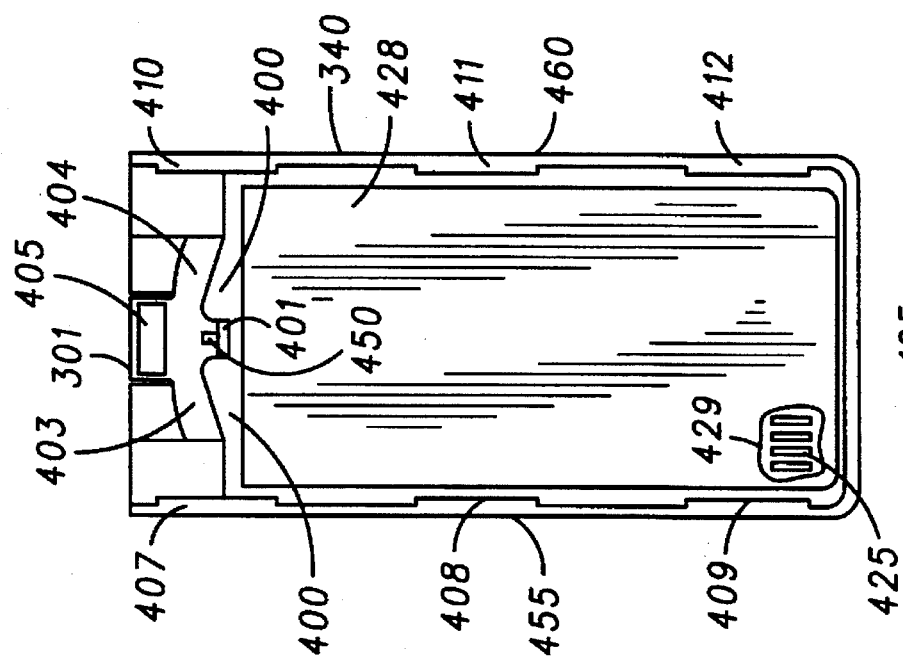
FIG. 4 is a front-view illustration of the battery of FIG. 3.

FIG. 4 is an illustration showing a frontal view of battery 105. FIG. 4 shows battery housing 340 further including an inner surface 400, a side wall 455, and a side wall 460. Side wall 455 includes guide rails 407, 408, and 409, and side wall 460 includes guide rails 410, 411, and 412. Latching mechanism 301 includes a torsion plate 403, a torsion plate 404, a button portion 405, a catch 401, and a tab 450. (A close-up view of latching mechanism 301 is shown in FIG. 5.) Disposed within battery 105 are battery cells and associated circuitry, which include electrical contacts 425. Battery 105 also includes a housing portion 428 which has a hole 429 that exposes electrical contacts 425. In the preferred embodiment, housing portion 428 is vacuum-molded and ultrasonically welded to battery housing 340.

Referring to FIGS. 2 and 4, when battery 105 is fully attached to radiotelephone body 102, slot 212 is positioned such that it engages catch 401. Guide rails 407, 408, 409, 410, 411, and 412 of battery 105 are disposed opposite and captivated beneath guide rails 213, 214, 215, 216, 217, and 218 of radiotelephone body 102. Battery 105 is thereby in a "locked" position, that is, it is securely attached to radiotelephone body 102. In the locked position, electrical contacts 425 of battery 105 make electrical contact with electrical contacts 225 of radiotelephone body 102. When battery 105 is in the locked position, radiotelephone 100 is operable since power is supplied from battery 105.

To disengage battery 105 from radiotelephone body 102, button portion 405 is pushed in a direction toward radiotelephone body 102 (indented area 227 offering additional room for button portion 405 to be depressed), thereby causing torsion plates 403 and 404 to torsionally twist and cause catch 401 to retract from slot 212. This action releases battery 105 from the locked position and enables it to be removed from radiotelephone body 102. For removal, battery 105 is slid along a direction of guide rails 213, 214, 215, 216, 217, and 218 until it can be lifted and completely detached.

Figure 6:
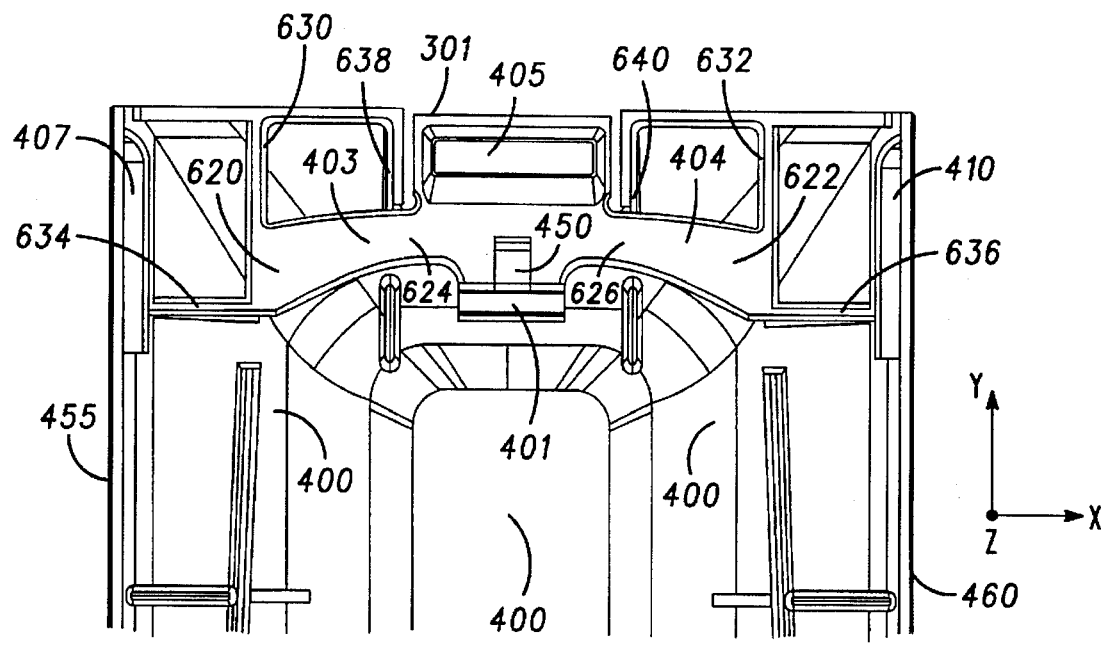
FIG. 6 is a front-view illustration of a portion of a battery housing of the battery of FIGS. 3 and 4.
Figure 7:
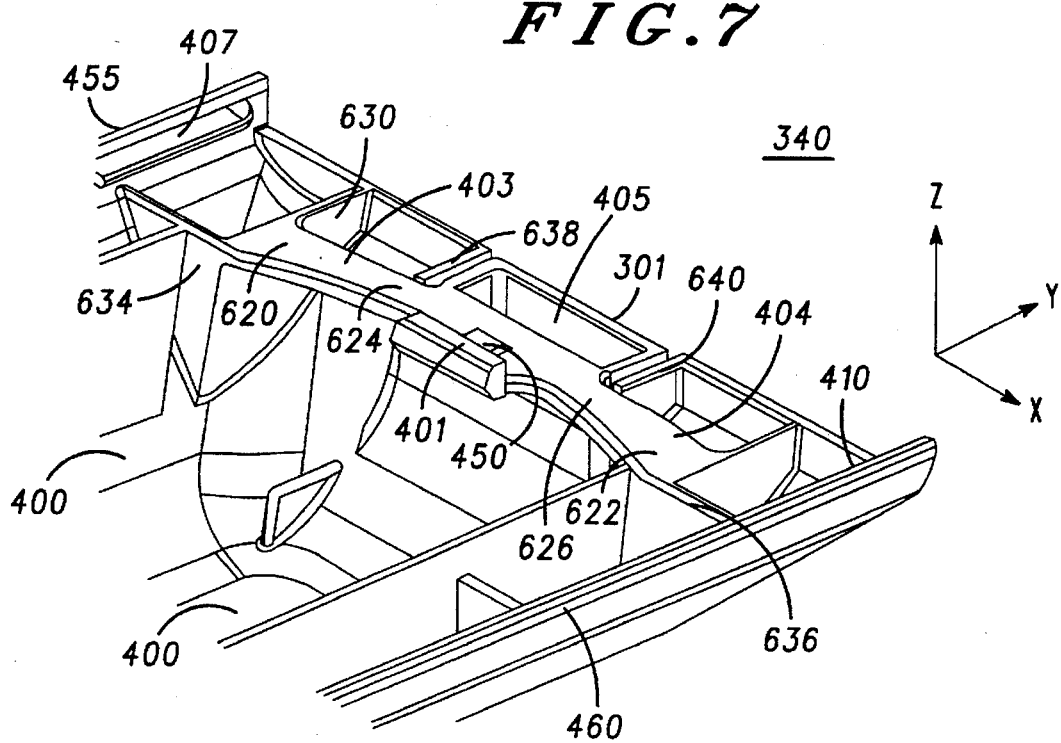
FIG. 7 is an alternate-view illustration of the portion of the battery housing of FIG. 6.
Figure 8:
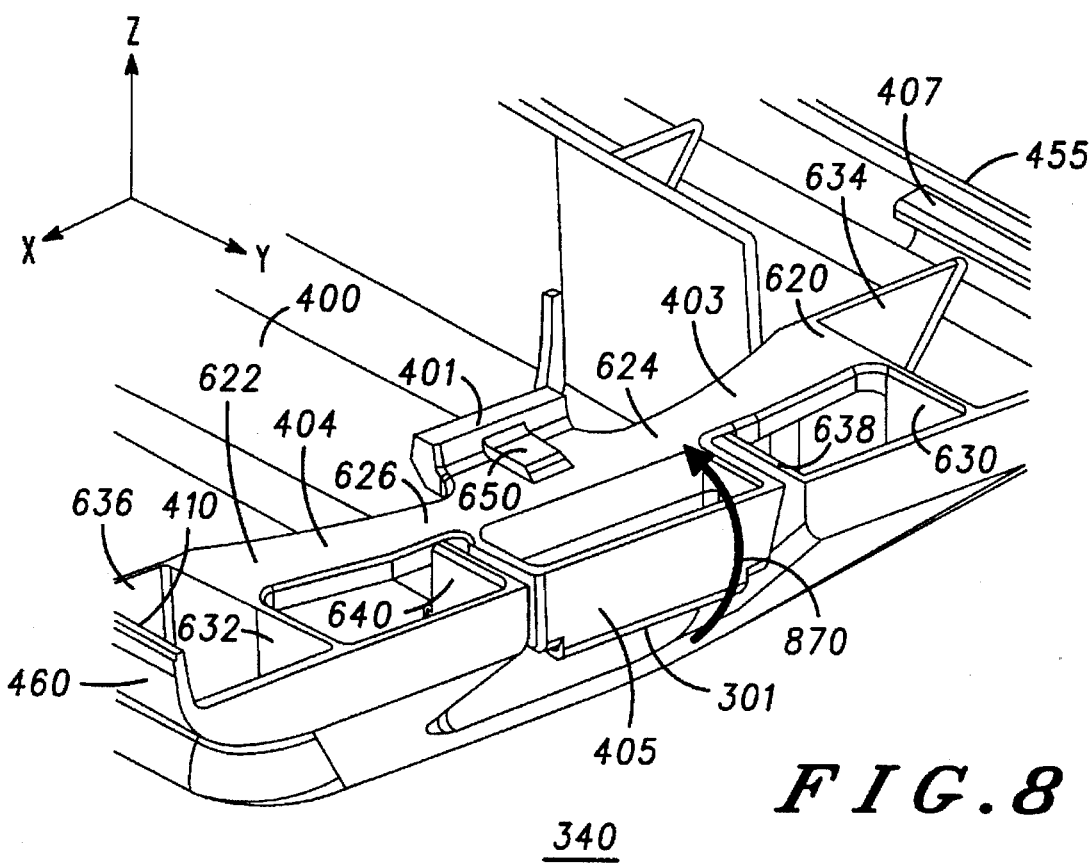
FIG. 8 is another alternate-view illustration of the portion of the battery housing of FIG. 6.

FIGS. 6, 7, and 8 each show a close-up of a portion of battery housing 340 including latching mechanism 301. (An x-direction, a y-direction, and a z-direction are also shown in FIGS. 6, 7, and 8 for orientation.) FIGS. 6, 7, and 8 show torsion plate 403 having an end 620 and an end 624, and torsion plate 404 having an end 622 and an end 626. Battery housing 340 further includes ribs 630, 632, 634, and 636 (attachment ribs) and ribs 638 and 640 (support ribs). Here, ribs 630, 632, 634, 636, 638, and 640 are planar in structure, and thus may also be called planar ribs. Rib 630 extends upwardly (in the z-direction) from inner surface 400 and attaches to end 620 of torsion plate 403. Similarly, rib 632 extends upwardly (in the z-direction) from inner surface 400 and attaches to end 622 of torsion plate 404. Ribs 630 and 632 support latching mechanism 301 at a distance above inner surface 400. Ribs 634 and 636 also extend upwardly (in the z-direction) from inner surface 400 and attach to ends 620 and 622 of torsion plates 403 and 404 respectively, similarly supporting latching mechanism 301 at the distance above inner surface 400. Ribs 634 and 636 are positioned perpendicular to ribs 630 and 632. Torsion plates 403 and 404 are shaped in a tapered fashion such that ends 620 and 622 are wider than ends 624 and 626.

Rib 638 extends upwardly from inner surface 400 and has an end positioned adjacent to torsion plate 403. Similarly, rib 640 extends upwardly from inner surface 400 and has an end positioned adjacent to torsion plate 404. Ribs 638 and 640 are positioned such that when latching mechanism 301 is displaced in the y-direction (keeping battery housing 340 in a fixed position), torsion plate 403 may touch rib 638 and torsion plate 404 may touch rib 640. Such positioning is intended to stop latching mechanism 301 from moving too far out of position in the y-direction when subjected to a strong force in that direction. Such a force may be exerted when, for example, a user drops radiotelephone 100 onto a surface.

Referring specifically to FIG. 8, button portion 405 may be depressed in the z-direction for battery removal such that latching mechanism 301 moves in an arcuate motion designated by an arrow 870. The arcuate motion is provided by a torsional twisting of torsion plates 403 and 404. Torsion plates 403 and 404 are preferably made from a plastic, more particularly, from plastic called PX0722 (or NORYL™, a grade of polyphenaline oxide manufactured by General Electric). Torsion plates 403 and 404 have an average width defined in a plane parallel to the x-y plane and an average thickness defined by a plane parallel to the y-z plane, where the average width is several times greater than the average thickness. Torsion plates 403 and 404 have a sufficient pliability for providing the arcuate motion of latching mechanism 301 needed to detach battery 105 from radiotelephone body 102. However, torsion plates 403 and 404 are sufficiently rigid to retain catch 401 within slot 212 when battery 105 is in the locked position.

Torsion plates 403 and 404 also provide a strong resistance to any forced deflection of latching mechanism 301 in the y-direction. Such resistance is desirable since battery 105, when attached to radiotelephone body 102, is not allowed to move or rattle freely or easily in the y-direction. If subject to such force, latching mechanism 301 has a greater tendency to rotate than to translate. Since movement in the y-direction is minimized, the material of torsion plates 403 and 404 is less likely to deform and lose its important mechanical properties. Torsion bars used in conventional designs only provide a small resistance to a forced deflection, thereby undesirably allowing a battery freedom of movement in the y-direction when attached to a radiotelephone. Since a material of the torsion bars is subject to considerable movement, the small resistance may result in a loss of important mechanical properties of the material over time, and therefore allow an even greater unrestrained freedom of movement of the battery. Conventional designs have included metal braces around each torsion bar for increased resistance and strength, but the metal braces are an additional expense and assembly for a latching mechanism design.

Figure 9:
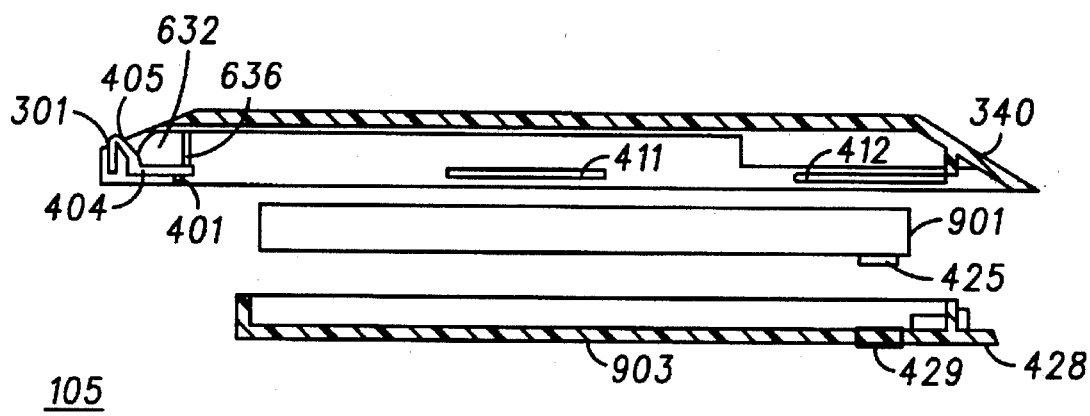
FIG. 9 is an exploded cross-sectional side view of the battery of FIGS. 3 and 4.

FIG. 9 shows a cross-sectional exploded view of battery 105. Battery 105 includes battery cells and associated circuitry 901 which are disposed within battery housing 340. Housing portion 428 covers battery cells and associated circuitry 901, where housing portion 428 is affixed to battery housing 340 via a vacuum-molding and ultrasonic welding process. The vacuum-molding and ultrasonic welding process inherently allows housing portion 428 to have a small weight. When battery 105 is fully assembled and manufactured, latching mechanism 301 rests at a height almost flush with, but preferably lower than, a top surface 903 of housing portion 428.

Figure 10:
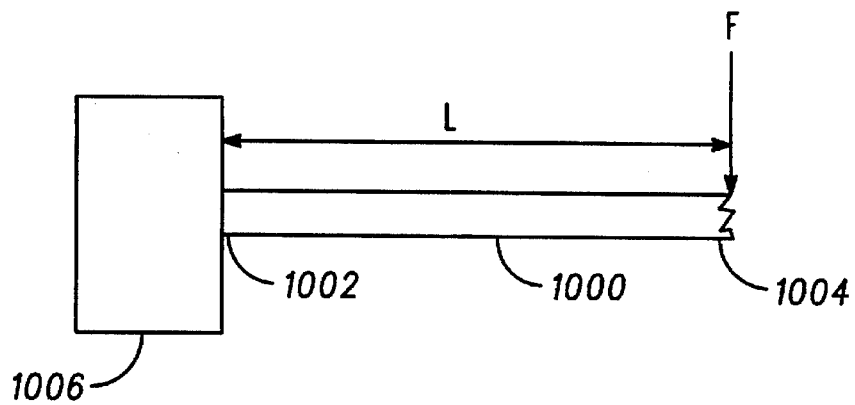
FIG. 10 is an illustration of a beam having an applied force F, shown for analytical purposes.

For performing an approximate analysis, FIG. 10 shows a torsion beam 1000 having a length L. Torsion beam 1000 has a first end 1002 and a second end 1004, where first end 1002 is secured to a fixed body 1006 and second end 1004 has a force F applied thereto in a downwards direction. A deflection of torsion beam 1000 can be given by the relation $$d_y = FL^3 / 3EI_y,$$

where

E is the modulus of elasticity of torsion beam 1000; and $I_y$ is the moment of inertia of a cross section of torsion beam 1000.

Note that the deflection is inversely proportional to $I_y$.

Figure 11:
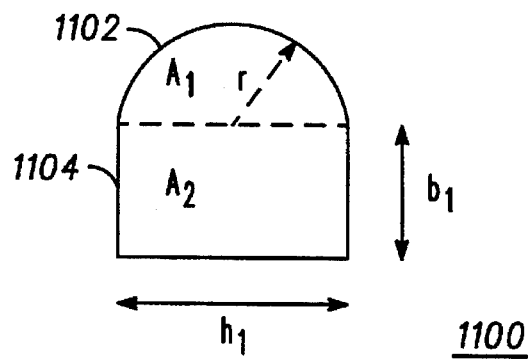
FIG. 11 is a cross section of a torsion bar of the prior art, shown for analytical purposes.

FIG. 11 shows a cross section of a torsion beam used in a conventional design, namely, a torsion bar 1100. Torsion bar 1100 comprises a section 1102 (a half-cylindrical portion) and a section 1104 (a rectangular portion). Section 1102 has a radius r and an area $A_1$, and section 1104 has a base $b_1$, a height $h_1$, and an area $A_2$. Typically, r=1.25 mm, $b_1$=1.3 mm, and $h_1$=2.5 mm.

The parallel axis theorem states that a particular relation exists between the moments of inertia of a cross section with respect to an arbitrary xy coordinate system and the moments of inertia of the same cross section with respect to a parallel, centroidal xy coordinate system. Applying the parallel axis theorem to torsion bar 1100, the moment of inertia $I_x$ can be given by $$I_x = [I_{x1102} + (A_1)(y^*_c - y_{1102})^2] + [I_{x1104} + (A_2)(y^*_c - y_{1104})^2],$$

where
- $I_{x1102}$ is the moment of inertia of section 1102 in the x-direction;
- $y_{1102}$ is a y-axis distance from an origin of the arbitrary xy coordinate system to an origin of the centroidal xy coordinate system as applied to section 1102;
- $I_{x1104}$ is the moment of inertia of section 1104 in the x-direction;
- $y_{1104}$ is a y-axis distance from the origin of the arbitrary xy coordinate system to the origin of the centroidal xy coordinate system as applied to section 1104; and
- $y^*_c$ is a y-coordinate of a centroid of the cross section, which may be expressed as $y^*_c = (y_{1102}A_1 + y_{1104}A_2)/(A_1 + A_2)$.

Solving for the above values, $A_1 = b_1 h_2 = (1.3 \text{ mm})(2.5 \text{ mm}) = 3.25 \text{ mm}^2$;

$A_2 = (\frac{1}{2})\pi r^2 = (\frac{1}{2})\pi (1.25 \text{ mm})^2 = 2.45 \text{ mm}^2$;

$y_{1102} = (4r/3\pi) + 1.3 \text{ mm} = 4(1.25 \text{ mm})/3\pi + 1.3 \text{ mm} = 1.83 \text{ mm}$;

$y_{1104} = b_1/2 = 1.3 \text{ mm}/2 = 0.65 \text{ mm}$;

$I_{x1102} = (\frac{1}{8})\pi r^4 = (\frac{1}{8})\pi (1.25 \text{ mm})^4 = 0.96 \text{ mm}^4$;

$I_{x1104} = (\frac{1}{12})b_1 h_1^3 = (\frac{1}{12})(2.5 \text{ mm})(1.3 \text{ mm})^3 = 0.46 \text{ mm}^4$; and $y^*_c = ((0.96 \text{ mm})(2.45 \text{ mm}^2) + (0.65 \text{ mm})(3.25 \text{ mm}^2))/(3.25 \text{ mm}^2 + 2.45 \text{ mm}^2) = 1.16 \text{ mm}$.

Solving for $I_x$, $I_x = 0.96 \text{ mm}^4 + (2.45 \text{ mm}^2)(1.16 \text{ mm} - 1.83 \text{ mm})^2 + 0.46 \text{ mm}^4 + (3.25 \text{ mm}^2)(1.16 \text{ mm} - 0.65 \text{ mm})^2$ $I_x = 0.96 \text{ mm}^4 + 1.1 \text{ mm}^4 + 0.46 \text{ mm}^4 + 0.95 \text{ mm}^4$ $I_x = 3.37 \text{ mm}^4$.

An approximation of the moment of inertia $I_y$ of the cross section of torsion bar 1100 can be expressed as $$I_y = (\tfrac{1}{8})\pi r^4 + (\tfrac{1}{12})b_1 h_1^3.$$

Solving for $I_y$, $I_y = (\frac{1}{8})\pi (1.25 \text{ mm})^4 + (\frac{1}{12})(1.3 \text{ mm})(2.5 \text{ mm})^3$ $I_y = 2.65 \text{ mm}^4$.

The polar moment of inertia $J_0$ of torsion bar 1100 can be expressed as $$J_0 = I_x + I_y.$$

Plugging in the above values of $I_x$ and $I_y$, $J_0 = 3.37 \text{ mm}^4 + 2.65 \text{ mm}^4$ $J_0 = 6.02 \text{ mm}^4$.

Figure 12:
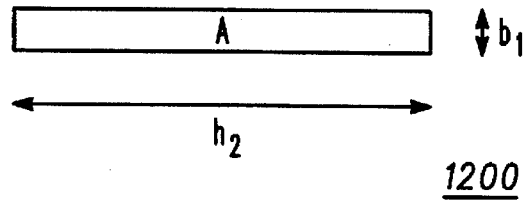
FIG. 12 is a cross section of a torsion plate in accordance with the present invention, shown for analytical purposes.

FIG. 12 shows a cross section of a torsion plate 1200 in accordance with the present invention. Torsion plate 1200 has base $b_2$, a height $h_2$, and an area A. The polar moment of inertia for torsion plate 1200 can be expressed by the relation $$J_0 = (\tfrac{1}{12})b_2 h_2 (b_2^2 + h_2^2).$$

Solving for $h_2$, using the same value of $J_0$ found for torsion bar 1100 of the prior art ($J_0 = 6.02 \text{ mm}^4$) and assuming that $b_2 = 1$ mm, $6.02 \text{ mm}^4 = (\frac{1}{12})(1 \text{ mm})h_2((1 \text{ mm})^2 + h_2^2)$ $6.02 \text{ mm}^4 = (\frac{1}{12})h_2 + (\frac{1}{12})h_2^3$ $72.24 \text{ mm}^4 = h_2(1 + h_2^2)$ $h_2 \approx 4.1$ mm.

The moment of inertia $I_y$ of torsion plate 1200 can be found by the relation $$I_y = (\tfrac{1}{12})b_2 h_2^3.$$

Plugging in $b_2$ and $h_2$ from above, $I_y = (\frac{1}{12})(1 \text{ mm})(4.1 \text{ mm})^3$ $I_y = 5.74 \text{ mm}^4$.

Comparing the $I_y$ of torsion plate 1200 above ($I_y = 5.74 \text{ mm}^4$) and the $I_y$ of torsion bar 1100 used in the conventional design ($I_y = 2.65 \text{ mm}^4$), the moment of inertia $I_y$ is increased by 116% while the polar moment of inertia $J_0$ remains the same ($J_0 = 6.02 \text{ mm}^4$). Since deflection $d_y$ is inversely proportional to $I_y$, latching mechanism 301 will have a smaller deflection in the y-direction than a latching mechanism having torsion bars when the same force F is applied. This is desirable since battery 105, when attached to radiotelephone body 102, is not allowed to move or rattle freely or easily in the y-direction. Also, since movement in the y-direction is minimized, the material of torsion plates 403 and 404 is less likely to deform and lose its important mechanical properties.

While particular embodiments of the present invention have been shown and described, modifications may be made. It is therefore intended in the appended claims to cover all such changes and modifications which fall within the true spirit and scope of the invention.

What is claimed is:

1. A battery comprising:
   a battery housing having an inner surface, said battery housing further including:
   a latching mechanism, said latching mechanism further including a button portion, a first torsion plate, a second torsion plate, and a catch;
   a first rib and a second rib, said first rib coupled to said inner surface and upwardly extending and coupled to an end of said first torsion plate, said second rib coupled to said inner surface and upwardly extending and coupled to an end of said second torsion plate, said first and second ribs supporting said latching mechanism at a distance above said inner surface;
   a housing portion affixed to said battery housing; and
   battery cells and associated circuitry disposed within said battery housing.

2. The battery of claim 1 wherein said battery is used for operating a radiotelephone.

3. The battery of claim 1 wherein said housing portion is ultrasonically welded to said battery housing.

4. The battery of claim 1 wherein said battery housing further comprises:
   a third rib and a fourth rib, said third rib coupled to said inner surface and extending upwardly and coupled to said end of said first torsion plate, said fourth rib coupled to said inner surface and extending upwardly and coupled to said end of said second torsion plate, said third and fourth ribs supporting said latching mechanism at said distance above said inner surface.

5. The battery of claim 1 wherein said battery housing further comprises:
   a fifth rib and a sixth rib, said fifth and sixth ribs coupled to said inner surface and extending upwardly from said inner surface, said fifth rib having an end positioned adjacent to said first torsion plate, said sixth rib having an end positioned adjacent to said second torsion plate, said fifth and sixth ribs inhibiting a large deflection of said latching mechanism.

6. A battery housing having an inner surface, a first rib, and a second rib, said first and second ribs extending upwardly from said inner surface, said battery housing further comprising:

a latching mechanism further including:
  a button portion; and
  a first torsion plate and a second torsion plate, said first torsion plate having a first end coupled to said first rib and a second end coupled to said button portion, said second torsion plate having a first end coupled to said second rib and a second end coupled to said button portion, said first and second torsion plates torsionally twisting upon a depression of said button portion.

7. The battery housing of claim 6 further comprising:

a first side wall having at least a first guide rail; and a second side wall having at least a second guide rail.

8. The battery housing of claim 6 further comprising:

a third rib and a fourth rib, said third rib coupled to said inner surface and extending upwardly and coupled to said first end of said first torsion plate, said fourth rib coupled to said inner surface and extending upwardly and coupled to said first end of said second torsion plate.

9. The battery housing of claim 6 further comprising:

a fifth rib and a sixth rib, said fifth and sixth ribs coupled to said inner surface and extending upwardly from said inner surface, said fifth rib having an end positioned adjacent to said first torsion plate, said sixth rib having an end positioned adjacent to said second torsion plate, said fifth and sixth ribs inhibiting a large deflection of said latching mechanism.

* * * * *